United States Patent [19]

Klimpke

[11] Patent Number: 5,370,363
[45] Date of Patent: Dec. 6, 1994

[54] WEDGE GUIDE
[75] Inventor: Reinhard Klimpke, Eckental, Germany
[73] Assignee: KSB Aktiengesellschaft, Frankenthal, Germany
[21] Appl. No.: 157,117
[22] PCT Filed: May 11, 1992
[86] PCT No.: PCT/EP92/01027
  § 371 Date: Dec. 6, 1993
  § 102(e) Date: Dec. 6, 1993
[87] PCT Pub. No.: WO92/21902
  PCT Pub. Date: Dec. 10, 1992
[30] Foreign Application Priority Data
  Jun. 4, 1991 [DE] Germany .................. 4118292
[51] Int. Cl.$^5$ .............................. F16K 3/00
[52] U.S. Cl. ........................ 251/329; 251/367
[58] Field of Search .................... 251/329, 367
[56] References Cited
  U.S. PATENT DOCUMENTS
  4,081,175  3/1978  Hasbrouch .............. 251/329 X Primary Examiner—John C. Fox
Attorney, Agent, or Firm—Darby & Darby

[57] ABSTRACT

The invention relates to a wedge guide for a gate valve which is able to be inserted into the housing of the gate valve. A readily replaceable wedge guide which is well adapted to the particular requirements has a tube part fitted with two guide bars and which has recesses encompassing the seat rings arranged in the housing of the gate valve.

4 Claims, 1 Drawing Sheet

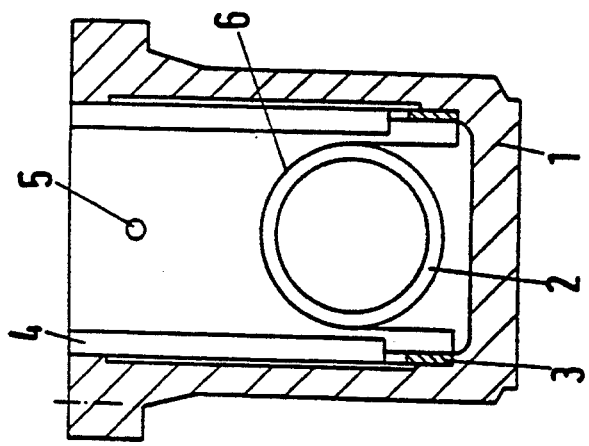
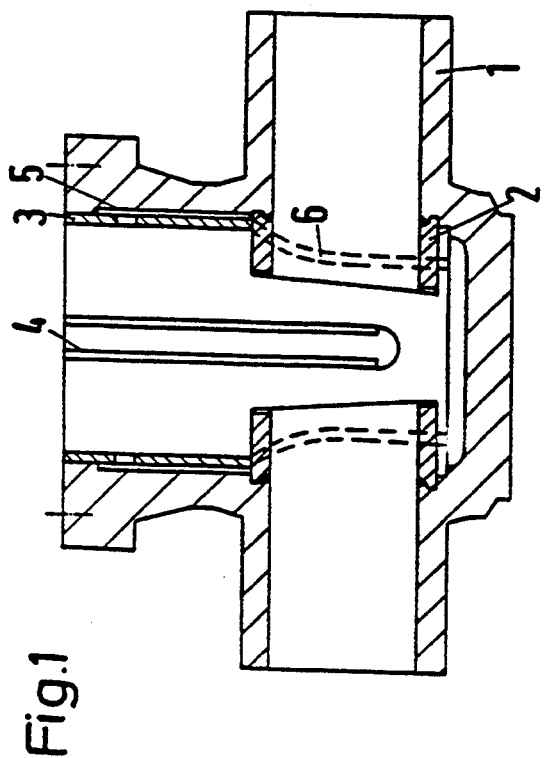
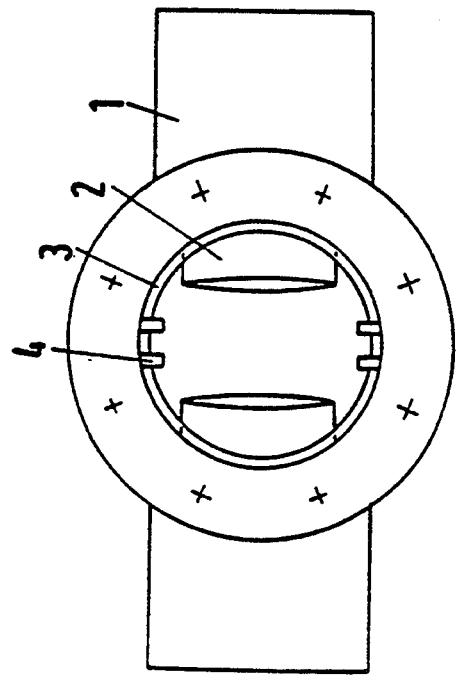

WEDGE GUIDE

FIELD OF THE INVENTION

The present invention relates to a wedge guide for a gate valve. More specifically, the present invention relates to a wedge guide which is able to be inserted into the housing of the gate valve.

BACKGROUND OF THE INVENTION

In order to achieve the object of guiding the valve member of a gate valve during upward and downward movement and to bring it into exact engagement with the seating rings it is necessary for the wedge guide to resist the flow forces acting on the valve member. In the case of gate valves, which do not have any external stop block it is furthermore necessary for the torque of the spindle to be taken up by the wedge guide.

In most cases the wedge guide is permanently connected with the housing wall and it is then either in the form of a welded on bar or in the form of a machined groove or a bar, that is to say the material of the wedge guide is the same as that of the housing. The materials utilized for the housing are however generally only able to withstand very low surface stresses. In the case of gate valves however very high surface stresses frequently occur at the wedge guides dependent on the rated width and the stress differential. Many different forms of damage therefore occur, that in the case of housings welded into pipelines is very difficult to repair. This is something directly affecting the functional reliability of such a gate valve.

The German patent 2,113,415 discloses a wedge guide mounted in a gate valve housing but which however is designed for cooperation with a valve member having parallel walls and sliding on the flat walls of the wedge guide. This wedge consisting essentially of two plates slipped over the seat rings of the gate valve is not suitable for a valve member with a wedge-like outline and for a guiding action using guide bars.

One object of the present invention is to provide a replaceable wedge guide of the type equipped with guide bars, which may be quickly and simply fitted and removed.

SUMMARY OF THE INVENTION

This object is attained by a tube part (3) fitted with two guide bars (4) and adapted to be inserted into the housing (1) of the gate valve, said tube part (3) having recesses (6) arranged therein partly encompassing the seat rings (2) mounted in the housing (1). Therefore when fitting it is merely necessary to insert the wedge guide downwards into the housing. Owing to the recesses it is possible for the tube part to fit over the seat rings and for this reason to extend as far as the floor part of the gate valve. The recesses are similar to a U-like cavity.

In accordance with a further possible advantageous development the replaceable wedge guide may be centered or positioned by the seat rings arranged in the housing of the gate valve, the recesses on the tube part of the wedge guide corresponding to the outline of the seat rings. Widening out such a recess of the tube part on the side facing the housing floor of the gate valve, which tapers upwards in a manner adapted to the outer diameter of the seat rings, renders possible rapid and accurate fitting of the wedge guide. The widened zone arranged in the lower portion of the tube part with the following taper ensures automatic centering of the wedge guide if it is inaccurately inserted. In order to be able to quickly remove the wedge guide again, the same may be provided with a plurality of notches, accessible from the inside, for an extractor tool.

BRIEF DESCRIPTION OF THE DRAWINGS

The invention will now be described in more detail with reference to a specific embodiment.

FIG. 1 is a sectional view of a wedge housing with a wedge guide in accordance with the invention;

FIG. 2 is a sectional view of FIG. 1; and

FIG. 3 is a top view of a wedge housing according to the invention.

DESCRIPTION OF THE INVENTION

The gate valve housing 1 is provided with welded-in seat rings 2, which are accurately machined to be on the axis of the pipeline or pipe. A tube part 3 is inserted into the gate valve housing said tube part 3 having guide bars 4 which extend exactly at a right angle to the axis of the pipe. The tube part 3 furthermore has a plurality of notches 5 spaced over the periphery for an extractor tool, not illustrated.

The centering of the tube part 3 in the housing is performed using machined cavities 6 which encompass the seat rings 2 and rest on their upper semi-circular outer surface with an accurate fit.

Since the wedge guide is in the form of a tube part 3 able to be separated from the housing 1, it is possible to select a material suited to the particular requirements, The integrated guide bars 4 may be armored or hardened. Thus the wedge in accordance with the invention not only has a substantially lower wear rate than a wedge guide integrated with the housing but furthermore it may be readily replaced without the wedge guide having to be separated from the piping.

I claim:

1. A wedge guide for a gate valve which is inserted into a housing of the gate valve, comprising a plurality of seat rings mounted in said housing, a tube part fitted with two guide bars, said tube part being inserted into the housing of the gate valve, said tube part having recesses disposed therein and partly encompassing the seat rings.

2. The wedge guide as claimed in claim 1 wherein said recess has an outline adapted to assist guiding and centering of the inserted tube part, the upper part of said outline corresponding to an outline of the seat rings.

3. The wedge guide as claimed in claim 1 wherein the recess has a widening part in the lower portion thereof, said widened part tapering to the outer diameter of the seat ring.

4. The wedge guide as claimed in claim 1, wherein the tube part includes a plurality of notches which are accessible from the inside of said tube part.

* * * * *